Jan. 10, 1939.      L. D. MANNES ET AL      2,143,786
PHOTOGRAPHIC SCREENING DYE

Filed March 15, 1935

Fig. 1.

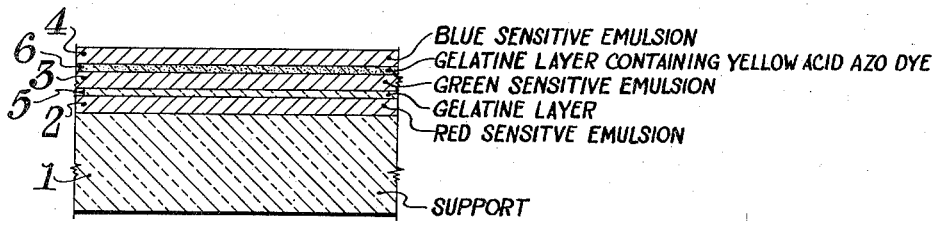

- BLUE SENSITIVE EMULSION
- GELATINE LAYER CONTAINING YELLOW ACID AZO DYE
- GREEN SENSITIVE EMULSION
- GELATINE LAYER
- RED SENSITVE EMULSION
- SUPPORT

Fig. 2.

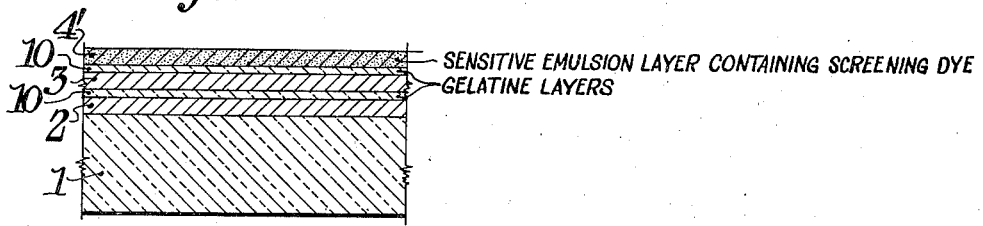

- SENSITIVE EMULSION LAYER CONTAINING SCREENING DYE
- GELATINE LAYERS

Fig. 3.

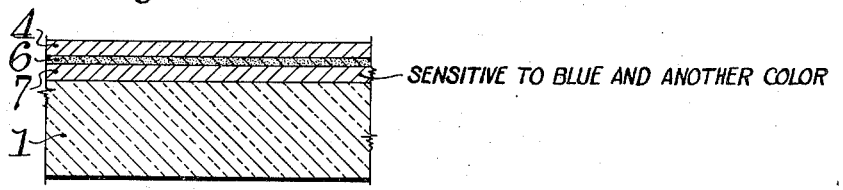

- SENSITIVE TO BLUE AND ANOTHER COLOR

Leopold D. Mannes,
Leopold Godowsky, Jr., &
Burt H. Carroll,
Inventors

By Newton N. Perrins
R. Frank Smith
Attorneys

Patented Jan. 10, 1939

2,143,786

UNITED STATES PATENT OFFICE 2,143,786

PHOTOGRAPHIC SCREENING DYE

Leopold D. Mannes, Leopold Godowsky, Jr., and Burt H. Carroll, Rochester, N. Y., assignors, by mesne assignments, to Eastman Kodak Company, Jersey City, N. J., a corporation of New Jersey Application March 15, 1935, Serial No. 11,280

13 Claims. (Cl. 95—2)

This invention relates to photographic elements and more particularly to such elements carrying yellow screening dies either in the emulsion layer or in a separate layer.

Emulsions which are to be used in recording different colors in known processes of color photography are usually sensitized with cyanine dyes. Since all silver halide emulsions thus sensitized are sensitive to blue light, it is frequently necessary to make use of a yellow screening dye to prevent blue light from reaching such portions of the sensitive element as are to record only red or green light. The yellow dye used for this purpose is frequently mixed directly with a sensitive emulsion, although it may be coated as a separate layer over an emulsion layer to be screened. Several well-known yellow dyes such as Tartrazine, Naphthol yellow and Quinoline yellow have been used for this purpose, but they are unsuitable for incorporation in cyanine-sensitized emulsions as they cause considerable desensitizing in the color sensitized region.

The principal object of the present invention is to provide yellow screening dyes which do not desensitize cyanine-sensitized and other sensitive emulsions. A further object is to provide novel screening dyes for light-sensitive photographic emulsions.

These objects are accomplished by the present invention by the use of simple acid azo dyes in the screening layer.

In the accompanying drawing, Fig. 1 is a section of a film having three emulsion layers on one side thereof and a gelatin layer containing a screening dye between the two outer layers. Fig. 2 is a section of a similar type of film in which the screening dye is incorporated in the outer sensitive layer. Fig. 3 is a section of film having only two sensitive layers. All figures are on a much exaggerated scale. Like reference characters denote like parts in the three figures.

Dyes which we have found suitable are aromatic azo compounds having an acid reaction, particularly those in which one or more hydroxy groups are substituted in one or more of the benzene or naphthalene nuclei, such as benzene-azo-phenol, α-naphthalene-azo-phenol, benzene-azo-resorcinol and 1-hydroxy 4(p-hydroxyphenyl-azo) naphthalene. Other substituents such as alkyl groups may be present, as for example in benzene-azo-cresol. We are not limited, however, to the mono-azo dyes. Disazo dyes, such as Pyramidol brown (Rowe, Color Index, 1924, No. 380), or the dye obtained by coupling two molecules of salicylic acid to one of p-phenylenediamine, may also be used. Dyes suitable for our purpose include also azo dyes having other nuclear substituents such as carboxyl, alkoxy, chlorine or bromine groups. Dyes containing the carboxyl group are benzene azo benzoic acid and Diamond yellow G, formed by coupling m-aminobenzoic acid and salicylic acid (Rowe, Color Index No. 218). None of these dyes contain a sulfonic acid group since we have found that the sulfonic group causes desensitization of the silver halide emulsion with which it comes in contact.

The following example serves to illustrate a method of using our invention: a yellow dye of the type referred to, for example, benzene-azo-resorcinol, is dissolved in water and acetone in the amount of about 1 gram in 5 cc. of water and 5 cc. of acetone. This is mixed with a solution of 10 grams of gelatin and is then ready to be coated over the emulsion layer.

In the accompanying drawing, Fig. 1 illustrates a photographic element having a gelatin screening layer prepared in this manner. On the support 1, which is preferably a transparent sheet of cellulosic derivative but may be of glass or paper, there are coated emulsion layers 2, 3 and 4 which are differentially sensitive to various regions of the spectrum such as red, green and blue, respectively. Between emulsion layers 2 and 3 there is a plain gelatin layer 5 and between emulsion layers 3 and 4 there is the yellow screening layer 6 prepared in the manner described above. This screening layer prevents blue-light rays from reaching the emulsion layers 2 and 3 when the film is exposed to light. These emulsion layers 2 and 3, which are intended to record red and green light, are unavoidably sensitive to blue light; consequently, blue light must be excluded from them. Fig. 2 shows a modified form of film in which the layers 2, 3 and 4' are, as before, sensitive to red, green and blue light, respectively, and are coated on the support 1. In this modification, the intermediate layers 10 are not essential, but, if present, consist of plain gelatin, and the yellow screening dye is incorporated in the outer blue sensitive emulsion layer 4'. The yellow screening dye used in these films is of a type which is decolorized and removed in the baths in which the films are processed.

In the form shown in Fig. 3, the lower layer 7 may be green or red sensitive or panchromatic and the outer layer 4 blue sensitive, as before and the intervening insensitive dyed layer 6 has the function and properties already described. This embodiment is of use in two-color photography.

We do not wish to be limited to the modifications and examples described in the specification but contemplate the use of all equivalents which fall within the scope of the appended claims.

What we claim is:

1. A sensitive photographic element comprising a support, a cyanine-sensitized gelatino-silver halide emulsion layer thereon, and a layer of transparent material over said sensitive layer, having uniformly distributed therein an azo dye containing an acid radical selected from the group consisting of hydroxyl and carboxyl radicals and containing no sulfonic acid radical.

2. A photographic element including an emulsion layer sensitive to blue light and in contact therewith a screening layer comprising a transparent material containing a nuclear hydroxy derivative of an aromatic azo compound uniformly dispersed therethrough, and a sensitive emulsion layer containing a cyanine dye adjacent to the screening layer.

3. A sensitive photographic element comprising a support, at least two superposed sensitive layers thereon, all being sensitive to blue light and a lower one being also sensitive to a color other than blue, said element including above said second-named sensitive layer a screening layer containing uniformly distributed therethrough an azo dye containing an acid radical selected from the group consisting of hydroxyl and carboxyl radicals and containing no sulfonic acid radical, said dye being absorptive of blue light, at least one of the sensitive layers adjacent the screening layer being sensitized with a cyanine dye.

4. A sensitive photographic element comprising a support, at least two superposed layers thereon, all being sensitive to blue light and a lower one being also sensitive to a color other than blue, and an inert layer between said two layers and containing a uniformly distributed azo dye containing an acid radical selected from the group consisting of hydroxyl and carboxyl radicals and containing no sulfonic acid radical, at least one of the sensitive layers adjacent the layer containing the azo dye being sensitized with a cyanine dye.

5. A sensitive photographic element comprising a support, at least two superposed sensitive layers thereon, all being sensitive to blue light and a lower one being also sensitive to a color other than blue, said element including above said second-named sensitive layer a screening layer containing uniformly distributed therethrough a nuclear hydroxy derivative of an aromatic azo compound containing no sulfonic acid radical, at least one of the sensitive layers adjacent the screening layer being sensitized with a cyanine dye.

6. A sensitive photographic element comprising a support, at least two superposed sensitive layers thereon, all being sensitive to blue light and a lower one being also sensitive to a color other than blue, said element including above said second-named sensitive layer a screening layer containing uniformly distributed therethrough an azo benzene dye containing an acid radical selected from the group consisting of hydroxyl and carboxyl radicals and containing no sulfonic acid radical, at least one of the sensitive layers adjacent the screening layer being sensitized with a cyanine dye.

7. A sensitive photographic material comprising a support, at least three differently sensitized emulsion layers on one side of the support, and a nuclear hydroxy derivative of an aromatic azo compound containing no sulfonic acid group uniformly dispersed in a layer over the two sensitive layers nearest the support, at least one of the sensitive layers adjacent the layer containing the azo compound being sensitized with a cyanine dye.

8. A sensitive photographic material comprising a support, at least three differently sensitized emulsion layers on one side of the support, and an azo benzene dye containing an acid radical selected from the group consisting of hydroxyl and carboxyl radicals and containing no sulfonic acid radical, uniformly dispersed in a layer over the two sensitive layers nearest the support, at least one of the sensitive layers adjacent the layer containing the azo benzene dye being sensitized with a cyanine dye.

9. A sensitive photographic material comprising a support, at least three differently sensitized superposed emulsion layers on one side of the support, the emulsion layer farthest from the support having a nuclear hydroxy derivative of an aromatic azo compound containing no sulfonic acid radical, uniformly dispersed therein, at least one of the sensitive layers contiguous to the layer containing the aromatic azo compound containing a cyanine dye.

10. A sensitive photographic material comprising a support, at least three differently sensitized emulsion layers on one side of the support, the emulsion layer farthest from the support having an azo benzene dye containing an acid radical selected from the group consisting of hydroxyl and carboxyl radicals and containing no sulfonic acid radical, uniformly dispersed therein, at least one of the sensitive emulsion layers contiguous to the layer containing the azo benzene dye containing a cyanine dye.

11. A sensitive photographic material comprising a support, at least three differently color sensitized emulsion layers all sensitive to blue light, separated by inert gelatin layers on one side of the support, one of the inert gelatin layers having an azo dye containing an acid radical selected from the group consisting of hydroxyl and carboxyl radicals and containing no sulfonic acid radical, absorptive of blue light, uniformly dispersed therein, at least one of the sensitive emulsion layers adjacent said last-mentioned gelatin layer containing a cyanine dye.

12. A sensitive photographic material comprising a support, at least three differently color sensitized emulsion layers, all sensitive to blue light, separated by inert gelatin layers on one side of the support, the outermost inert gelatin layer having an azo dye containing an acid radical selected from the group consisting of hydroxyl and carboxyl radicals and containing no sulfonic acid radical, absorptive of blue light, uniformly dispersed therein, at least one of the sensitive emulsion layers adjacent said last-mentioned gelatin layer being sensitized with a cyanine dye.

13. A sensitive photographic material comprising a support, at least three differently sensitized emulsion layers separated by inert gelatine layers on one side of the support, the outermost inert gelatine layer having a nuclear hydroxy derivative of an aromatic azo compound containing no sulfonic acid radical, uniformly dispersed therein, at least one of the layers adjacent the layer containing the azo compound being sensitized with a cyanine dye.

LEOPOLD D. MANNES.
LEOPOLD GODOWSKY, JR.
BURT H. CARROLL.